United States Patent [19]

Waters

[11] Patent Number: 4,997,864
[45] Date of Patent: Mar. 5, 1991

[54] COMPOSITE PARTICLE DISPERSIONS

[75] Inventor: Julian A. Waters, Goring-on-Thames, England

[73] Assignee: Imperial Chemical Industries PLC, London, United Kingdom

[21] Appl. No.: 301,052

[22] Filed: Jan. 24, 1989

[30] Foreign Application Priority Data

Jan. 29, 1988 [GB] United Kingdom ............... 8801961
Sep. 27, 1988 [GB] United Kingdom ............... 8822667

[51] Int. Cl.$^5$ .............................................. C08J 7/04
[52] U.S. Cl. .................................... 523/319; 523/333; 523/334; 427/221
[58] Field of Search ..................... 523/319, 333, 334; 427/221

[56] References Cited

U.S. PATENT DOCUMENTS

| 3,161,602 | 12/1964 | Herbig et al. | 428/402.2 |
| 4,016,099 | 4/1977 | Wellman et al. | 427/221 |
| 4,097,553 | 6/1978 | Novak | 525/80 |
| 4,133,774 | 1/1979 | Brynko et al. | 427/221 |
| 4,440,879 | 4/1984 | Kawachi et al. | 523/334 |
| 4,800,103 | 1/1989 | Jeffs | 523/334 |

FOREIGN PATENT DOCUMENTS

| 0195661 | 9/1986 | European Pat. Off. |
| 1017676 | 1/1966 | United Kingdom | 427/221 |
| 1138570 | 1/1969 | United Kingdom |

OTHER PUBLICATIONS

Polymer Handbook 2nd Ed., Brandrup, J; Immergut, E. H., Editors, John Wiley & Sons, New York, 1975.
Chemical Abstracts, Pressure-fixing type capsule toners. Canon K. K. Jpn. Kokai Tokkyo Koho 80 89,855, vol. 94, 1981.

Primary Examiner—Joseph L. Schofer
Assistant Examiner—Tom Weber
Attorney, Agent, or Firm—Cushman, Darby & Cushman

[57] ABSTRACT

A process for the preparation of composite particle dispersons is disclosed. The composite particles have a core particle 1 surrounded by a second material 2. Normally a core shell particle will be formed and the second material which forms the shell will be a polymer material.

The composite particles are formed by mixing a dispersion of polymer particles with pre-formed core material particles. The polymer particles are stabilized relative to one another, and the core material particles are destabilized in the dispersion so that they are able to make contact with the surfaces of the polymer particles. The process takes place at a temperature above the operative glass transition temperature of the polymer, and in the process the polymer spreads over the surface of the core particle so that the core particle is encapsulated.

The process will proceed, and composite particles will be formed, when the interfacial energies of the three interfaces (core/polymer: core/liquid: polymer/liquid) and the relative volumes of the core particles and polymer particles are related to one another in accordance with an equation which is set out in the specification.

28 Claims, 6 Drawing Sheets

COMPOSITE PARTICLE DISPERSIONS

This invention relates to composite particle dispersions of the type where a first component is partially or wholly engulfed by a second component and the resulting particle is of a colloidal size. Colloidal size particles generally have a particle diameter of less than 10 micrometers.

Where a single particle of the first component is wholly engulfed, the composite particles may be referred to as core-shell particles. Other types of composite particle are also known in the prior art, for example particles where a number of first component particles are encapsulated within a single particle of the second component. Composite particles of these types may find applications in a wide variety of fields, one example of which is in the field of paints and other liquid coating compositions where the core particles, i.e. the engulfed first components, take the form of fillers or extenders for the composition. The invention is particularly concerned with a process for making a dispersion of such particles and with processes for modifying and controlling the modification of structures in this type of particle, as well as to the particles themselves and particularly to aqueous dispersions of the particles.

Core-shell particles have been made in the past by polymerising monomer in the presence of already-formed particles, where the pre-formed particles constitute the core, and the polymerisation process produces polymer which is located around the surfaces of the core particles with the intention of ultimately encapsulating the core particles.

This process involves a chemical reaction, and it has proved difficult to ensure that the correct physical structure or morphology is obtained, partly because the core particles are subjected to the chemistry of the polymerisation process, and this may affect the characteristics of the core particles, with the result that certain core particles cannot be handled in this way. The process will only work successfully with specific combinations of components, under specific reaction conditions. In particular, this surface polymerisation process does not generally work when the core particles are hydrophilic/lyophilic.

In addition to this surface polymerisation process, agglomeration processes are known for making composite particles. An example of an agglomeration process is disclosed in U.S. Pat. No. 4,133,774 which describes a process where a composite particle is produced with a magnetic core and another component around the core. The surrounding component builds up on the core by an agglomeration process where discrete particles collect around the core. This process does not produce a dispersion where the particles are stable against flocculation and agglomeration.

We have now found a new mechanism which provides a positive, thermodynamically-driven route leading to the production of composite particle dispersions and which allows formation of composite particle structures from a wide variety of components.

STATEMENT OF INVENTION

According to the invention, there is provided a process for preparing a dispersion of composite particles which process comprises mixing first particles with a liquid dispersion of polymer particles, the polymer particles being stable against particle-particle flocculation and agglomeration, wherein the mixing takes place at a temperature above the operative glass transition temperature of the polymer particles and under a condition where $$\frac{\gamma_{1\text{-}3} - \gamma_{1\text{-}2}}{\gamma_{2\text{-}3}} \geq \frac{1 - v_p^{\frac{1}{3}}}{v_c^{\frac{1}{3}}}$$

where
- $\gamma_{1\text{-}3}$ is the interfacial energy of the first particle surface/liquid interface
- $\gamma_{1\text{-}2}$ is the interfacial energy of the first particle surface/polymer particle interface
- $\gamma_{2\text{-}3}$ is the interfacial energy of the polymer particle surface/liquid interface
- $v_p$ and $v_c$ represent the relative volumes of, respectively, the average polymer particle and the average first particle, with $v_p + v_c = 1$ and where the first particles are able to make contact with the surfaces of the polymer particles so that when contact occurs between first particles and polymer particles, the polymer particles spread over the surfaces of the first particles to create a dispersion of composite particles which have stability against particle—particle flocculation and agglomeration.

Because the first particles and the polymer particles are produced separately, the reaction conditions for production of the particles themselves can be chosen so as to be optimum for production of the particular particles desired. Particles which have stability against flocculation and agglomeration do not coagulate and do not form aggregates of a permanent nature. The particles may however, in some applications, show weak non-permanent flocculation such as is used to produce structure in some paint compositions. Settlement of the composite particles in the liquid medium is however not excluded, and may occur if the density and/or size of the particles is sufficiently great.

This process will result in the formation of partially or wholly engulfed or encapsulated particles and, under preferred conditions, in the formation of so-called core-shell particles where a first particle (also referred to herein as a core particle) is wholly encapsulated by a layer of polymer.

The particles, the liquid medium and the process conditions will therefore be chosen such that the total interfacial energy for the core-shell particles in the liquid medium is less than the total interfacial energy for the separately dispersed first particles and polymer particles in the medium.

References to the polymer particles spreading over the surfaces of the first particles include the cases where the first particle is completely encapsulated by the polymer particle as well as cases where the first particle is only partially covered by the polymer.

The liquid medium is preferably water or an aqueous medium. By "aqueous medium", we mean water or a water-miscible liquid (which may be a mixture of water with other liquids).

In connection with the process of the invention, it is important to consider whether the particle surfaces are of a hydrophobic/hydrophilic character (where the process takes place in an aqueous medium) or of a lyophobic/lyophilic character (where the process takes place in a non-aqueous medium). To avoid undue verbosity, the terms hydrophobic and hydrophilic will be used in this specification and, except where it is excluded by the context, hydrophobic is to be understood as including lyophobic and hydrophilic is to be understood as including lyophilic.

Preferably the surface of the polymer particles remains more hydrophilic/lyophilic than the surface of the first particles during the process.

In many commercially important processes in accordance with the invention, $$\frac{\gamma_{1-3} - \gamma_{1-2}}{\gamma_{2-3}}$$

will be greater than 0.5, and may be greater than 1.

When the polymer particles are dispersed in a non-aqueous liquid medium and the first particles have a lyophobic surface in the liquid medium, then the polymer particles have a surface composition which includes oligomer or polymer or polymer components soluble in the liquid phase sufficient to give these particles a lyophilic surface.

The first particles may be dispersed in a liquid medium prior to being mixed with the polymer particle dispersion. The liquid medium of the first particle dispersion is then preferred to be miscible with the liquid medium of the polymer particle dispersion.

Similarly, when the polymer particles are dispersed in an aqueous medium, the first particles should have a hydrophobic surface and the polymer particles should have a surface composition which includes oligomer or polymer or polymer components soluble in the liquid phase sufficient to give the polymer particles a hydrophilic surface.

It will be apparent from the description of the process of our invention that any polymer may be used to provide polymer particles provided a stable dispersion of the polymer particles is available or can be made and that the operative glass transition temperature is, or is modified to be, lower than the temperature at which the process is to be operated. The polymer may include or comprise, but is not limited to, acrylic acid or any ester such as methyl acrylate, ethyl acrylate, propyl acrylate, butyl acrylate, 2-ethyl hexyl acrylate, glycidyl acrylate; methacrylic acid or any ester such as methyl methacrylate, ethyl methacrylate, propyl methacrylate, butyl methacrylate, lauryl methacrylate, cetyl methacrylate, stearyl methacrylate, ethylene glycol dimethacrylate, tetraethylene glycol dimethacrylate, glycidyl methacrylate, N,N-(methacryloxy hydroxy propyl)-(hydroxyalkyl) amino ethyl amidazolidinone; allyl esters such as allyl methacrylate; itaconic acid, crotonic acid or esters; maleic acid or esters such as dibutyl maleate, dioctyl maleate, diethyl maleate; styrene or substituted derivatives such as ethyl styrene, butyl styrene, divinyl benzene; monomer units which include an amine functionality such as dimethyl amino ethyl methacrylate, butyl amino ethyl methacrylate; monomer units which include an amide functionality such as acrylamide or methacrylamide; vinyl ethers, vinyl thioethers, vinyl alcohol, vinyl ketones, vinyl halides such as vinyl chloride, vinyl fluoride, vinylidene chloride, vinylidene fluoride, tetrafluoroethylene; vinyl esters such as vinyl acetate, vinyl versatate; vinyl nitriles, for example acrylonitrile, methacrylonitrile; diene monomer units such as butadiene, isoprene; allyl ethers such as allyl glycidyl ether. Alternatively, the polymer may be a polyoxide such as poly(ethylene oxide), poly(propylene oxide); a polyester such as poly(ethylene terephthalate), alkyd; polyurethane; polysulfonate; polysiloxane such as poly(dimethyl siloxane); polysulfide; poly(acetylene); polysulfone; polysulphonamide; polyamide such as poly(caprolactam), poly(hexamethylene adipamide); polyimine; polyurea; heterocyclic polymer such as polyvinylpyridine, polyvinyl pyrrolidinone; naturally occurring polymer such as natural rubber; gelatin; carbohydrate such as cellulose, alkyl cellulose; polycarbonate; polyanhydride; polyalkene such as ethylene-propylene copolymer.

The first particles may comprise or include inorganic, organic or polymeric materials. These include but in no way are limited to the polymers and polymer components listed above and pigments, fillers and extenders, for example, titanium dioxide, iron oxide, silica, alumina, lead oxide, lead chromate, zinc oxide, calcium carbonate, magnesium carbonate, barium sulphate, calcium sulphate, magnesium oxide, aluminium silicate, dolomite, talc, china clay, bentonite or mica.

Dispersions of the polymer particles in a liquid phase are used in our process and provided the particles do not dissolve in the liquid phase and remain stable, liquids may be selected from a very wide range. Liquids which are especially suitable include, without any limitations to these, water, methanol, ethanol, propanol, ethylene glycol, propylene glycol, glycerol, ethoxypropanol, propylene glycol methyl ether, ethoxyethanol, butoxyethanol, pentane, hexane, heptane, octane, nonane, decane, dodecane, tetradecane, cyclohexane, decalin and high-boiling paraffin mixtures.

The dispersion of polymer particles is preferably a latex which may be synthetic or naturally occurring. The polymer particles may include or comprise oligomers or polymer precursors including monomers. Additionally, the polymer particles may include an organic liquid residing at least partly inside the polymer particles. The organic liquid may be water-miscible or not, and may for example serve to alter the operative glass transition temperature for the polymer, or may serve to assist in film formation or may have some other useful function when the composite particles are made or used.

To achieve the necessary particle-particle stability of the polymer particles, any suitable stabilization mechanism can be used. For example, anionic, cationic, non-ionic or polymeric surfactants may be used when the polymer particle dispersion is a synthetic latex. In a particularly suitable stabilization mechanism, oligomer or polymer chains which are soluble in the liquid medium are covalently attached at the polymer particle surface. Suitable synthetic latexes may be pre-formed prior to the process of this invention by any of the well known preparative techniques such as dispersion or emulsion polymerisation techniques at ambient or elevated temperatures and pressures; by polymerisation in a wide variety of liquids (which need not be water dilutable), or by emulsification, micellisation or microemulsification techniques.

Where a natural latex is used, then this will be naturally stabilised.

The core particles may or may not include a surfactant. They may have a surface layer of relatively hydrophobic material which may be chemically linked to the particle surface or may be physically adsorbed at the surface. Where a hydrophobic material is physically adsorbed, then it should be ensured that it is not readily desorbed during the production of the composite particles.

The polymer particles will in most cases have surfactant at the surface to provide the necessary particle-particle stability. It is usually advantageous if the surfactant remains linked to the surface during the process because it can provide the resulting composite particle with stability against flocculation and agglomeration and usually will increase the hydrophilic nature of the surface of the polymer particles and this is advantageous to the process. The primary function of the surfactant is to maintain the stability of the final composite particles. Care should be taken to avoid the presence of excess surfactant during the process to avoid adsorption of the surfactant onto surfaces of the first particles.

Where the core particles include surfactant at their surface and the surfactant remains linked to the core surface, there may be cases where this surfactant will reduce the hydrophobic nature of the surface and this must be allowed for when selecting a system where the polymer particle is intended to have a more hydrophilic surface than the core material.

In order for the process to operate, it is necessary that the polymer particles be able to contact the surface of the core particles. In order to achieve this, a condition should be identified under which the core particles have no or reduced stability to flocculation with the polymer particles and under which the polymer particles retain full stability against flocculation with their own type. It may be best to slowly add the core particles to the dispersion of polymer particles. It is convenient if the core particles themselves are in a liquid dispersion and the core particle dispersion can then be added to the polymer particle dispersion.

In order to control the relative stabilities of the particles and/or to control the interfacial energies, the conditions in the combined dispersion may be altered in any way which will cause the core particles to become destabilised in the presence of the stable polymer particles. The conditions can, for example, be altered by addition of electrolyte or a water-miscible liquid such as methanol or ethanol to the dispersion, on the basis that the polymer particles will retain their stability in such a solution whilst the core particles will have reduced or no stability.

In other cases the necessary conditions can be generated by using a liquid dispersion of the core particles which is unstable to dilution with another liquid, and then slowly adding the core particle dispersion to a dispersion of the polymer particles in the other liquid. Alternative control mechanisms may involve the elevation (or reduction) of temperature or pressure to vary the stability of the particles, or the use of agitation or shearing techniques in the dispersion.

In yet other cases the necessary conditions can be generated using core particles which are solely ionically stabilised and polymer particles which have some steric stabilisation and adding compounds (e.g. surfactant molecules or polymer) which carry an opposite charge to the ionic stabiliser. Alternatively an electrolyte compound could be added. This method has advantages in that the compound of opposite charge is only required in very small amount and may be selected to increase the hydrophobic nature of the core particle which is advantageous for the process.

It may be desirable to provide different stabilisation mechanisms for the two types of particle; for example the polymer particles might be sterically stabilised whilst the core particles are ionically stabilised or the polymer particles might be cationically stabilised and the core particles anionically stabilised. In some such cases special additives or special agitation conditions may not be required.

The relative sizes and relative volumes of the first particles and the polymer particles have to be considered in accordance with the invention. The process of the invention works satisfactorily when the ratio of polymer particles to first particles is approximately 1:1. However other ratios may be used, and it is preferred that there be more first particles than polymer particles. In many cases the polymer particles will be larger than the first particles. In some cases, more polymer particles than first particles may be used with the intention that some polymer particles will be left as simple particles and will not form composites.

According to a second aspect of the invention there is provided a process for preparing a dispersion of composite particles in a liquid phase, the composite particles being stable against flocculation and agglomeration, which process comprises mixing first particles, which particles are not stable against flocculation and agglomeration in the process, with a liquid dispersion of polymer particles where the polymer particles are stable against flocculation and aggregation; wherein the mixing takes place place at a temperature above the operative glass transition temperature of the polymer particles and where and $$\theta_p < 90° \text{ and}$$

$$\cos \theta_p \geq \frac{1 - v_p^{\frac{2}{3}}}{v_c^{\frac{2}{3}}}$$

where $v_p$ and $v_c$ are fractional volumes such that $v_p + v_c = 1$ and where $\theta_p$ is the contact angle made by the material of the polymer particles in an environment of the liquid phase at a surface which has the surface composition of the first particles.

According to a third aspect of the invention there is provided a process for modifying the structure of a composition which contains, in a liquid dispersion, particles of one component surrounded by a polymer component and wherein the total solids volume represented by the particles of the one component is larger than the total process the liquid phase is removed, the one component forms a continuous matrix phase and the polymer particles are dispersed in the matrix phase.

In another embodiment, the polymer particles may form a second, continuous matrix phase.

The invention extends to a composite particle dispersion made by any of the processes described above, either in an aqueous medium or in a non-aqueous medium.

DRAWINGS

Various aspects of the invention and of this specification require reference to the accompanying drawings, and these drawings are listed below. The drawings are given by way of example and do not limit the scope of the invention. In the drawings, FIG. 1 shows first particles and polymer particles before composite particle formation;

Figure 1:
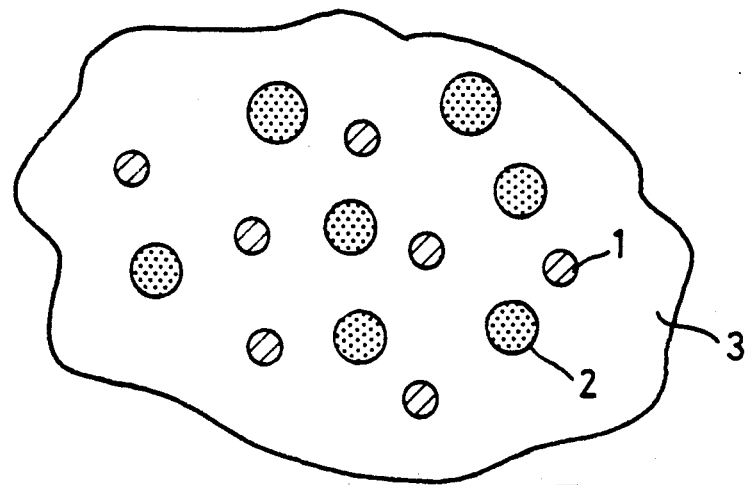

FIG. 1 shows first particles 1 and polymer particles 2 dispersed in a liquid medium 3. In this Figure, the particles are present in a 1:1 ratio, but this is not essential to the invention. The particle number ratios and particle volume ratios will be discussed later in this specification.

In practice, the polymer particles 2 will initially be in stable dispersion on their own in the liquid medium 3.

The first particles can then be added to the dispersion of polymer particles either in particulate form, or as part of a second stable dispersion of first particles.

Once the first particles are in the dispersion with the polymer particles, it is necessary that there be no barrier to contact between the first particles and the polymer particles. Where the first particles are added in particulate form, they may be unstable as soon as they enter the liquid phase. If the first particles are initially in their own stable dispersion, then they may become destabilised by virtue of the interaction between the two liquid mediums, i.e. the liquid medium in which the first particles are dispersed and the liquid medium in which the polymer particles are dispersed. In a third alternative, the dispersion of the first and polymer particles may remain stable, as shown in FIG. 1, until a further component is added to the dispersion which has the effect of destabilising the first particles.

Figure 2:
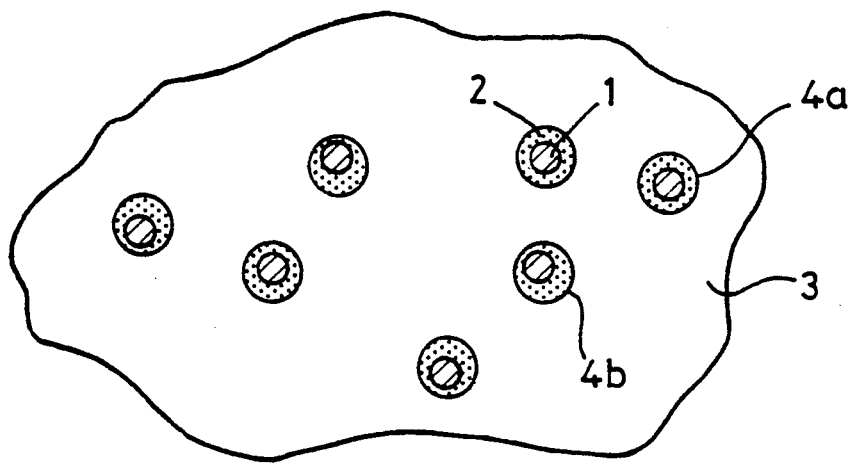
FIG. 2 shows a composite particle dispersion in a liquid medium in accordance with the invention.

Once destabilisation has occurred, and provided the conditions in accordance with the invention for production of composite particles are present, then composite particles 4 will form directly to produce the composites shown in FIG. 2 where the polymer particles wrap around the first particles. The process is thermodynamically-driven. There is however no significant difference in thermodynamic terms between a composite particle where the first particle is central in the composite (as at 4a) or where the first particle is off centre (as at 4b).

Figure 3:
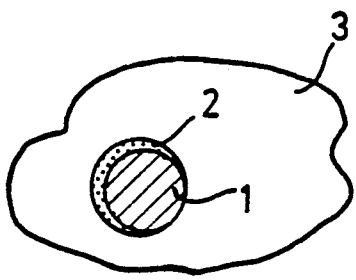
FIG. 3 shows a partially engulfed first particle.
Figure 4:
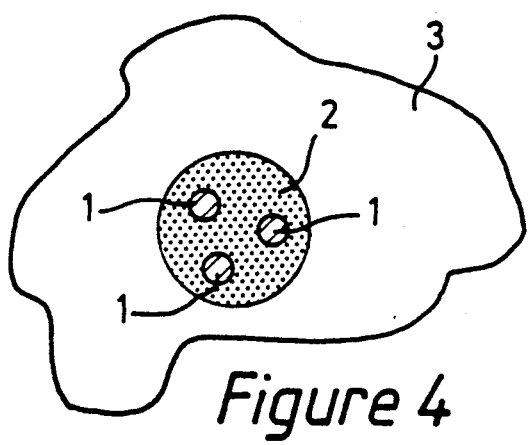
FIG. 4 shows a composite particle where a number of first particles are engulfed within a single polymer particle.

Dependent on the size and characteristics of the first and polymer particles, composite particles can either form as shown in FIG. 2, or partial engulfment can occur as shown in FIG. 3, or a number of first particles may be encapsulated in one polymer particle as shown in FIG. 4.

Whether or not it is possible to produce composite particles given a specific first particle, a specific polymer particle and a specific liquid medium can be ascertained by use of the Test Method described later in this specification. However if a negative result is given by the Test Method, then composite particle formation may still be achievable by (a) modifying the surface of one or the other of the particles with an added component, or (b) modifying the liquid phase to encourage destabilisation of the first particles or to change the interfacial energies in the system.

The factors to be considered in choosing the added component or liquid medium modifier will be apparent to the skilled person from the following discussion of general principles.

DISCUSSION OF GENERAL PRINCIPLES

When polymer particles have contacted the surface of the core particles, it is necessary that the polymer particles can spread over the surface of the core particles and that the polymer particles can at least partially encapsulate the core particles. The particles must have surfaces which, in the liquid medium, provide such interfacial energies that the encapsulation leads to a reduction in the total interfacial energy. The detail of this is discussed below in the section entitled "Theory" and this theory provides an explanation as to the conditions under which particular particle structures can be obtained.

In an important embodiment of the process of our invention, the liquid medium is water or an aqueous solution and with this liquid medium it is preferred that the polymer particles have a surface which is more hydrophilic than the surface of the core particles. This means that the interfacial energy for the interface between the polymer particle surface and water or aqueous solution is less than the interfacial energy for the interface between the core particle surface and water or aqueous solution. Conversely it can be said that it is preferred that the core particles have a surface which is more hydrophobic than the surface of the polymer particles. Particles with surfaces to meet this condition can be selected by considering surface tension data and by ensuring that the polymer particle surface has a surface tension nearer to the surface tension of the water or aqueous solution compared to the surface tension for the core particle surface. Presence of water-soluble polymer, oligomer or polymer components at the particle surface will increase the hydrophilic character of the particle surface. Allowance must be made for the presence of surfactants at the particle surfaces because surfactants will usually increase the hydrophilic nature of the surface. This is likely to be advantageous to encapsulation when the polymer particle retains surfactant during contact and encapsulation and when the core particle has surfactant which is removed or is rendered ineffective or is made hydrophobic at the area of contact with the polymer particle.

Under this preferred condition for the relative hydrophilic/hydrophobic nature of the particle surfaces, the polymer particles may be smaller than the core particles and in some cases may be very small compared to the core particle.

In order for the process to operate satisfactorily, it is necessary that the polymer of the polymer particle be able to spread over the surface of the core particle. We have found that this can be achieved above a transition temperature which we refer to in this specification as the operative glass transition temperature of the polymer. The operative glass transition temperature may be the same as the glass transition temperature normally associated with the bulk of the polymer particle, or may be made lower than the glass transition temperature ($T_g$) either by modifying the polymer structure or by including liquids or other compounds in the polymer particle which produce a lowering of the glass transition temperature.

An adequate guide to the operative glass transition temperature can be obtained by measuring the minimum film forming temperature (MFT). Measurement of the MFT is a technique known to those skilled in the art and one example of this technique is described in the Journal of Oil Colour Chemists Association, 1984, vol. 67, no. 7 page 197.

We were surprised to find that the process can be operated at a temperature which is only just above the operative glass transition temperature, at which temperature the internal viscosity of the polymer particles would be expected to be very high.

It is desirable that the polymer particles are not gel-particles and do not contain substantial internal cross-linking.

Although it is an important feature of the process described that composite particles can be prepared without the involvement of chemical reactions or polymerisation, chemical reactions may be used if desired to change the composite particles. For example, it may be desired that the two components become linked to each other during the formation of the composite particles or subsequently, or it may be desired that subsequent to composite particle formation, a polymer component should be cross linked within the particle or that a further component should be included within the composite particle, for example by adding and polymerising a monomer.

Where the composite particles have been prepared to include a significant liquid content, it may be desirable to cross-link the polymer component or to link the two components by suitable chemical bonding so that when the liquid component is removed subsequently, internal re-arrangement of the composite particle is inhibited. Alternatively, the glassy state can be used to inhibit or reduce internal re-arrangement of the polymer component(s).

In many cases, however, it will be desirable that internal re-arrangement be possible.

Under the preferred condition for the relative hydrophilic/hydrophobic nature of the particle surfaces, composite particles with a wide range of the two components can be made. Where $v_p$ and $v_c$ represent the relative volumes of, respectively, the average polymer particle and the average first particle, such that $v_p + v_c = 1$, then we believe that engulfment can proceed if $$\frac{\gamma_{1-3} - \gamma_{1-2}}{\gamma_{2-3}} \geq \frac{1 - v_p^{\frac{2}{3}}}{v_c^{\frac{2}{3}}} \quad (I)$$

where
$\gamma$ is interfacial energy and where
1-3 denotes the interface between the first particle surface and water or aqueous solution
1-2 denotes the interface between the first particle surface and the polymer particle (not surface) and
2-3 denotes the interface between the polymer particle surface and water or aqueous solution
Under this preferred condition:

$\gamma_{1-3} > \gamma_{2-3}$ and the expression for interfacial energies in the condition (I) may be expected to have a value in a range up to and exceeding 1. For example where $\gamma_{1-2}$ is relatively small and/or $\gamma_{2-3}$ is very small, the expression will have a value greater than 1, and it can be seen from condition (I) that encapsulation can proceed even if $v_p$ is very small. Where $\gamma_{1-2}$ is significant in value and the interfacial energy expression has a value less than one, there will be a lower limit to $v_p$ (and an upper limit to $v_c$) for encapsulation to proceed; and if the value for the expression decreases, the lower limit for $v_p$ will increase.

If the liquid medium is water or an aqueous solution and if the polymer particle surface is more hydrophobic than the core particle surface ($\gamma_{2-3} > \gamma_{1-3}$) then it is preferred that $v_p \gg v_c$. As stated above we believe that encapsulation can proceed in this case also, according to condition (I) above, but the interfacial energy expression in condition (I) will in this case have small values, much less than 1. This indicates that for encapsulation to proceed, the expression for fractional volumes in condition (I) must have a small value, i.e. it is probably necessary that $v_p > v_c$. However if $\gamma_{1-2} > \gamma_{1-3}$, the interfacial expression will have a value less than 0 and encapsulation will not proceed even if $v_p \gg v_c$.

If the liquid medium is a non-aqueous liquid or solution then it is preferred that the interfacial energy for the interface between the polymer particle surface and liquid medium ($\gamma_{2-3}$) is less than the interfacial energy for the interface between the core particle surface and liquid medium ($\gamma_{1-3}$), that is that the polymer particle surface is relatively lyophilic and that the core particle surface is relatively lyophobic.

Under this preferred condition where $\gamma_{1-3} > \gamma_{2-3}$ we believe that encapsulation can proceed as discussed above so that the relative proportions of the two components could be varied within a very wide range.

Where $\gamma_{2-3} > \gamma_{1-3}$ then it is preferred that $v_p \gg v_c$ and as discussed above it is believed that for encapsulation to proceed it is probably necessary that $v_p > v_c$. Further we believe that if the interfacial energy expression is less than 0 ($\gamma_{1-2} > \gamma_{1-3}$) then encapsulation will not proceed even when the core particle is relatively very small.

Often it is convenient to operate the process with very approximately equal numbers of polymer particles and core particles so that one polymer particle can encapsulate one core particle. The resulting composite particles then have an average total volume which is very approximately equal to the sum of the average volume for a polymer particle and the average volume for a core particle. It will be appreciated that for each particle type, a distribution of particle sizes will exist. By using a very approximate 1:1 ratio of particle numbers, the average volume content of each component in the composite particle will be directly related to the average sizes for the two dissimilar particles used in the process.

Other ratios of the two dissimilar particles may be used. For example it may be convenient to operate the process with an excess of polymer particles. Where some polymer particles remain without forming composite particles, this may be tolerated or even desirable for the intended end-use of the composite particles. Composite particles having more than one core particle included may be desired. The included core particles may or may not coalesce within the polymer particles to form a larger internal domain.

Figure 6:
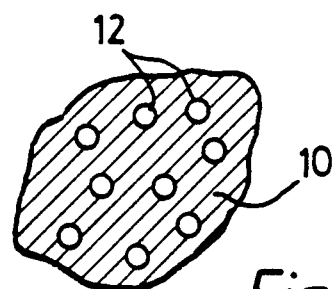
FIG. 6 shows a structure achieved after loss of the liquid medium.

In some cases composite particles are desired where the total volume contributed by core particles is larger than the total volume contributed by polymer particles and such that when the liquid phase is lost or removed they can undergo re-arrangement so that the core particle material can coalesce to form a matrix or continuous phase 10 (FIG. 6). In these cases the core and the shell material should not be intractable, non-fusible solids nor glassy polymers under the conditions of use.

In some such systems, the polymer particle component may form a continuous or matrix phase also, whereas in other such systems, the polymer particle component 12 may form a disperse, i.e. non-continuous phase, as shown in FIG. 6.

The expression $$\frac{\gamma_{1-3} - \gamma_{1-2}}{\gamma_{2-3}} \geq \frac{1 - \nu_p^{\frac{2}{3}}}{\nu_c^{\frac{2}{3}}} \quad \text{(I)}$$

is definitive of the conditions under which the process of this invention operates. However there are considerable practical difficulties in obtaining quantitative individual values for $\gamma$, the interfacial energy, for particular interfaces.

Fortunately, there is a known relationship between the interfacial energies in a three component system and a contact angle in that system. This relationship is expressed by the Young-Dupré equation.

Figure 10:
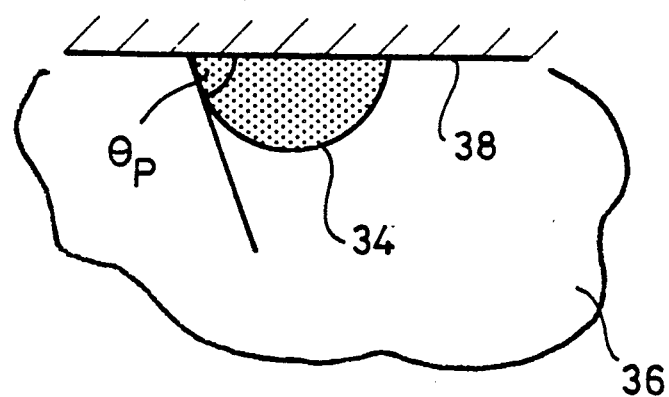
FIGS. 10, 11 and 12 show alternative possible results of the Test Method.

The Young-Dupré equation relates to a three component system as shown in FIG. 10, where the core particle surface 38 is A, the polymer 34 is B and the liquid 36 is C. Then $$\frac{\gamma_{A-C} - \gamma_{A-B}}{\gamma_{B-C}} = \cos \theta \text{ for } 0° < \theta < 180°$$

When $\theta$ is in the range 0° to 90°, $\cos \theta$ varies from 1 to 0.

If $\theta$ is greater than 90° (as in FIG. 12), then $\cos \theta < 0$.

The Young-Dupré equation is therefore a useful tool for obtaining a quantitative value for the entire left hand side of condition I. The value for the right handside of condition I is obtained by substitution. The method for doing this and assessing whether the condition I is fulfilled is discussed in the subsequent section titled "Test Method".

THEORY

In order to be able to predict and explain when and how composite particles can be formed in the manner described here, we have produced the following theoretical analysis of particle formation.

The theory requires a consideration of interfacial energies.

We will consider a condition where a one particle type 5 is mixed with another particle type 6 in a liquid medium 7 and where the interfacial energies are such that $$\gamma_{7-6} < \gamma_{7-5}$$

This condition will arise if, for example, the liquid medium is water and the particles 6 are more hydrophilic than the particles 5.

Figure 5A:
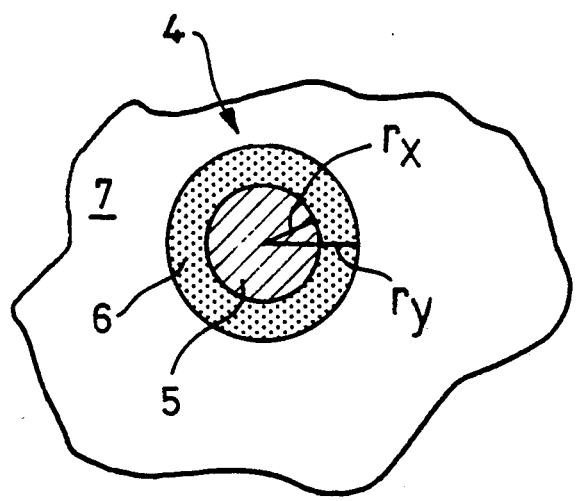
FIG. 5a shows a standard composite particle.

A composite particle 4 having a core 5 encapsulated by a shell 6 in a liquid medium 7 (FIG. 5a) may conveniently be defined as a standard core-shell particle.

Figure 5B:
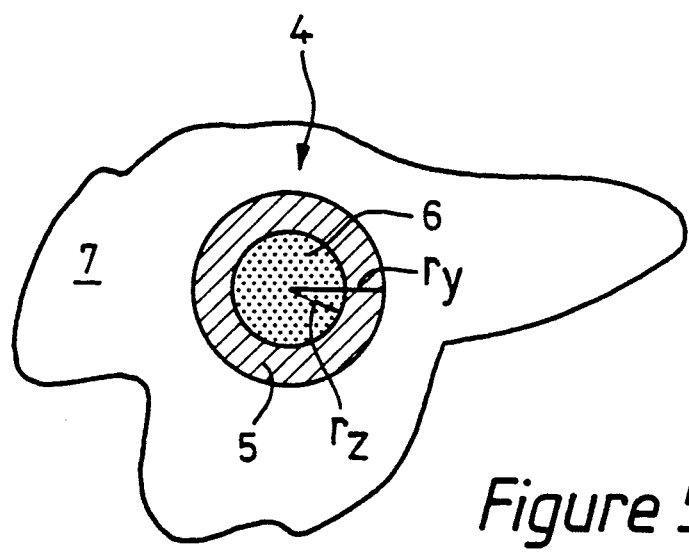
FIG. 5b shows an inverted composite particle.

A composite particle having the component 6 encapsulated by the component 5 in the liquid medium 7 as shown in FIG. 5b may be defined as an inverted core-shell particle.

The standard core-shell particle has interfacial energy given by $$E_{cs} = 4\pi[r_x^2 \gamma_{5-6} + r_y^2 \gamma_{6-7}] \quad \text{(III)}$$

For the inverted core-shell particle, the interfacial energy is given by $$E_{inv} = 4\pi[r_z^2 \gamma_{5-6} + r_y^2 \gamma_{5-7}]$$

It can be seen that $$r_2 = (r_y^3 - r_z^3)^{\frac{1}{3}}$$

$$E_{inv} = 4\pi[(r_y^3 - r_x^3)^{170} \gamma_{5-6} + r_y^2 \gamma_{5-7}] \quad \text{(IV)}$$

For separate particles, which have not formed composites, the interfacial energy is given by $$E_{sep} = 4\pi[r_x^2 \gamma_{5-7} + (r_y^3 - r_x^3)^{170} \gamma_{6-7}] \quad \text{(V)}$$

If a standard core-shell arrangement is considered where the proportion of the core is steadily increased (and the proportion of the shell is decreased), a composition may be reached where further increase in the core proportion would lead to the inverted core-shell having less total interfacial energy than the standard core-shell particles. At this transition $$E_{cs} = E_{inv} \text{ (see FIGS. 5}a \text{ and 5}b)$$

From equations (III) and (IV) it can be seen that at this transition $$\frac{\gamma_{5-7} - \gamma_{6-7}}{\gamma_{5-6}} = \frac{r_x^2 - (r_y^3 - r_x^3)^{\frac{2}{3}}}{r_y^2} \quad \text{(VI)}$$

If the volume of the core-shell is V and if the fractional volume of component 5 is $v_1$ and the fractional volume of component 6 is $v_2$ then $$v_1 = \frac{4\pi r_x^3}{3V} \text{ and } r_x = \left(\frac{3Vv_1}{4\pi}\right)^{\frac{1}{3}} \quad \text{(VII)}$$

and $$V = \frac{4\pi r_y^3}{3} \text{ and } r_y = \left(\frac{3V}{4\pi}\right)^{\frac{1}{3}} \quad \text{(VIII)}$$

From equations (VI), (VII) and (VIII), where $E_{cs} = E_{inv}$ $$\frac{\gamma_{5-7} - \gamma_{6-7}}{\gamma_{5-6}} = v_1^{\frac{2}{3}} - (1 - v_1)^{\frac{2}{3}}$$

By definition $$v_1 + v_2 = 1 \text{ and } 1 v_1 = v_2 \quad \text{(IX)}$$

When $E_{cs} = E_{inv}$ $$\frac{\gamma_{5-7} - \gamma_{6-7}}{\gamma_{5-6}} = v_1^{\frac{2}{3}} - v_2^{\frac{2}{3}} \quad \text{(X)}$$

At the transition where $$E_{cs} = E_{sep}$$

it can be seen from equations (III) and (V) that $$\frac{\gamma_{5-7} - \gamma_{5-6}}{\gamma_{6-7}} = \frac{r_y^2 - (r_y^3 - r_x^3)^{\frac{2}{3}}}{r_x^2}$$

and from equations (VII) and (VIII) that $$\frac{\gamma_{5-7} - \gamma_{5-6}}{\gamma_{6-7}} = \frac{1 - (1 - v_1)^{\frac{2}{3}}}{v_1^{\frac{2}{3}}}$$

and from equation (IX) that when $E_{cs} = E_{sep}$ $$\boxed{\frac{\gamma_{5-7} - \gamma_{5-6}}{\gamma_{6-7}} = \frac{1 - V_2^{\frac{2}{3}}}{V_1^{\frac{2}{3}}}} \quad (XI)$$

Similarly at the transition where $E_{inv} = E_{sep}$ it can be seen that $$\boxed{\frac{\gamma_{6-7} - \gamma_{5-6}}{\gamma_{5-7}} = \frac{1 - V_1^{\frac{2}{3}}}{V_2^{\frac{2}{3}}}} \quad (XII)$$

It can be seen that if the core material is C and the shell material is P in a liquid medium L, then from equation (XI) (and from equation XII)) that at the transition from core-shell to separate particles $$\boxed{\frac{\gamma_{C-L} - \gamma_{C-P}}{\gamma_{P-L}} = \frac{1 - V_P^{\frac{2}{3}}}{V_C^{\frac{2}{3}}}} \quad (XIII)$$

For a system for which the transition exists:

$$E_{cs} = E_{sep}$$

an increase in the fractional volume $v_p$ (and a decrease in the fractional volume $v_c$) beyond the fractional volume at the transition, will give a decrease in the total interfacial energy for the core shell particle and this decrease will exceed any decrease in interfacial energy for the equivalent separate particles. It can be seen that the core-shell particle will have lower interfacial energy than the separate particles if $$\boxed{\frac{\gamma_{C-L} - \gamma_{C-P}}{\gamma_{P-L}} > \frac{1 - V_P^{\frac{2}{3}}}{V_C^{\frac{2}{3}}}} \quad (XIV)$$

Because $$\left[ \frac{1 - V_P^{\frac{2}{3}}}{V_C^{\frac{2}{3}}} \right] \longrightarrow 1$$

as $v_c \to 1$ (and $v_p \to 0$) then if $$\frac{\gamma_{C-L} - \gamma_{C-P}}{\gamma_{P-L}} > 1$$

the core shell particle will have lower total interfacial energy than the separated particles for all values of $v_p$ (and $v_c$) and the transition composition will not be found.

Because $$\left[ \frac{1 - V_P^{\frac{2}{3}}}{V_C^{\frac{2}{3}}} \right] \longrightarrow 0$$

as $v_c \to 0$ (and $v_p \to 1$) then if $$\frac{\gamma_{C-L} - \gamma_{C-P}}{\gamma_{P-L}} < 0$$

the core shell particle will have higher total interfacial energy that the separate particles for all values of $v_p$ (and $v_c$).

The transition will exist where $$0 < \frac{\gamma_{C-L} - \gamma_{C-P}}{\gamma_{P-L}} < 1$$

The range of compositions ($v_c$:$v_p$) which can be used in core shell particles is increased and the thermodynamic driving force for engulfment is increased if $$\frac{\gamma_{C-L} - \gamma_{C-P}}{\gamma_{P-L}}$$

is increased, and this can be achieved by increasing $\gamma_{c-l}$ and/or decreasing $\gamma_{c-p}$ and/or decreasing $\gamma_{p-l}$.

TEST METHOD

The test method described here is a method of determining, for a particular three component system, the value of the expression $$\frac{\gamma_{1-3} - \gamma_{1-2}}{\gamma_{2-3}}$$

from Condition I

In this test method, reference is made to FIGS. 7 to 13 of the accompanying drawings.

The Young-Dupré equation is expressed as $$\frac{\gamma_{1-3} - \gamma_{1-2}}{\gamma_{2-3}} = \cos \theta_p$$

for $0° < \theta_p < 180°$.

It therefore becomes necessary to measure the angle $\theta_p$.

To measure $\theta_p$, a surface representing the first particles of the invention must first be prepared which can be placed in the correct liquid medium and on which a droplet of polymer can be placed. The test needs to be on a scale such that the contact between the surface and polymer sample can be visually observed and the contact angle measured. The test also requires that the polymer sample reach an equilibrium position on the surface within a reasonable time interval.

In the test, polymer particles are used together with any surface active constituents attached to or adsorbed at the surface. However it is necessary to provide the polymer in a liquid state with a sufficiently low viscosity to ensure that an equilibrium condition is reached within a reasonable time interval.

To prepare the polymer, the polymer particles are taken together with any surfactants or covalently attached liquid-medium-soluble polymer or oligomer chains. If the polymer at this stage is in the form of a powder or solid or a viscous liquid (viscosity greater than 10 stokes as measured using a bubble tube), then a solution of polymer is prepared. If the polymer itself cannot be obtained in a suitable liquid form, it may be possible to avoid or reduce the solvent liquid by preparing and using oligomer or low molecular weight polymer.

Where a solvent is required for the reasons set forth above, then a preliminary test will be carried out to identify a solvent which will have the same surface energy as the polymer bulk. Requirements of such a solvent are that it should (a) be a good solvent for the polymer;
(b) have a low or very low solubility in the liquid phase of the process in accordance with the invention;
(c) have no specific interaction with the surface of the first particles; and
(d) satisfy the two-stage preliminary test set out below.

Both the Preliminary and Main Tests will be conducted using a beaker 20 filled with water or another liquid medium 22 and with a buoyant sample holder 24 floating in the liquid. The sample holder will have a sample surface 26 fixed at one end and either one end or the other end of the holder will be weighted (e.g. with lead shot 28) so that the holder floats either with the sample surfacing facing downwards (FIG. 5a) or upwards (FIG. 5b).

PRELIMINARY TEST

Two surfaces 26 in the form of plaques or films are prepared which have the same composition as the bulk of the polymer particles i.e. the interior of the polymer particles with any surfactants, other surface-active components or liquid-phase-soluble components being excluded.

Preparation can be by spreading a solution or dispersion to give film formation on loss of solvent or diluent, or by drying the polymer and producing a plaque by compression moulding, at elevated temperature if appropriate.

Figure 7A:
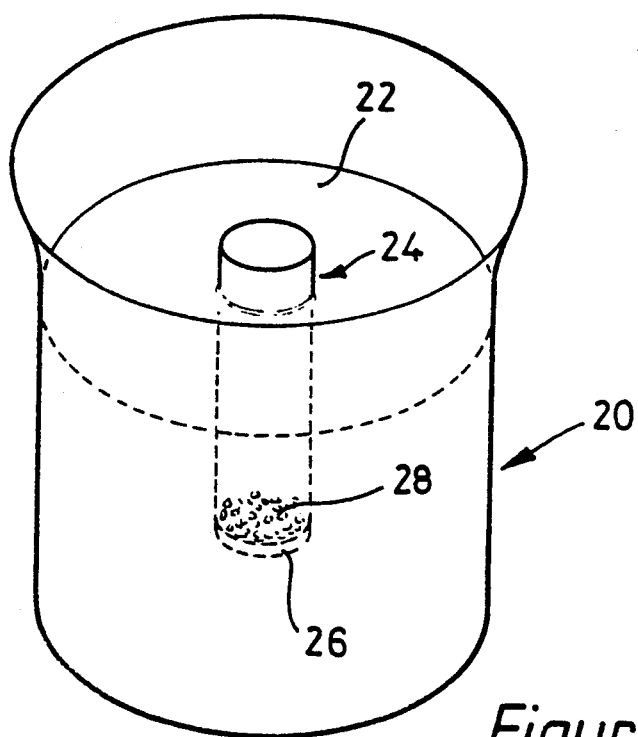
FIGS. 7a and 7b show apparatus for use in the Test Method.
Figure 7B:
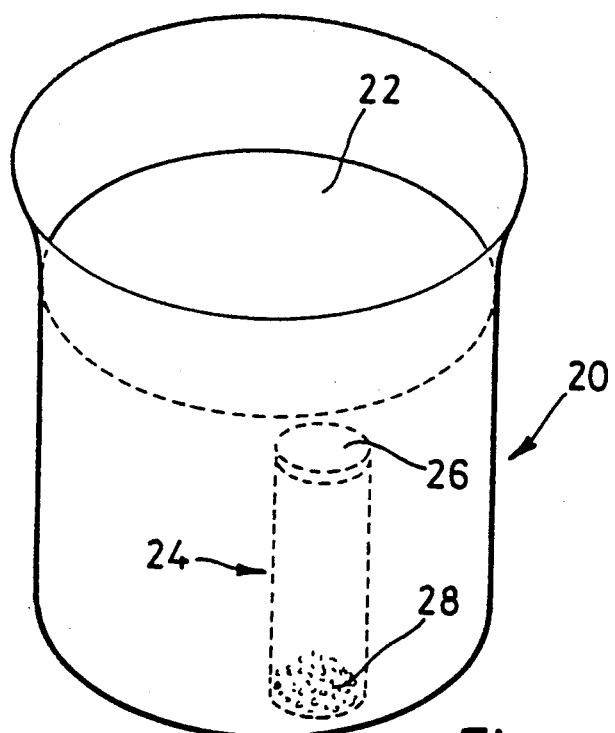
Figure 8:
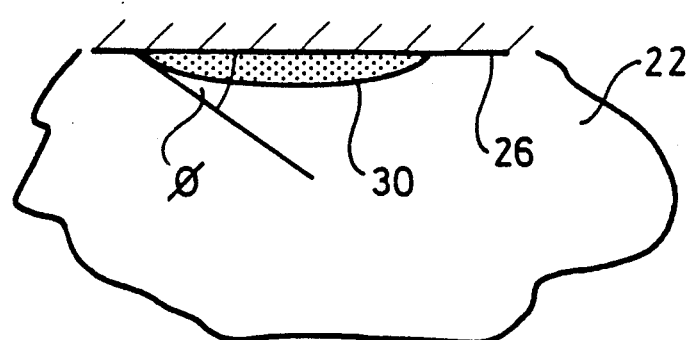
FIGS. 8 and 9 illustrate the results of the Preliminary Test.

In the first stage, one surface 26 is held in water 22 at 25° C. and a drop 30 of solvent is placed on the surface. Where the solvent is less dense than water, the surface will be inverted so that the drop remains in contact with the surface (FIG. 7a). The behaviour of the drop on the surface is observed immediately to see whether the drop forms a contact angle with the surface or spreads completely over the surface. This is illustrated in FIG. 8, where the contact angle $\theta$ is shown.

Figure 9:
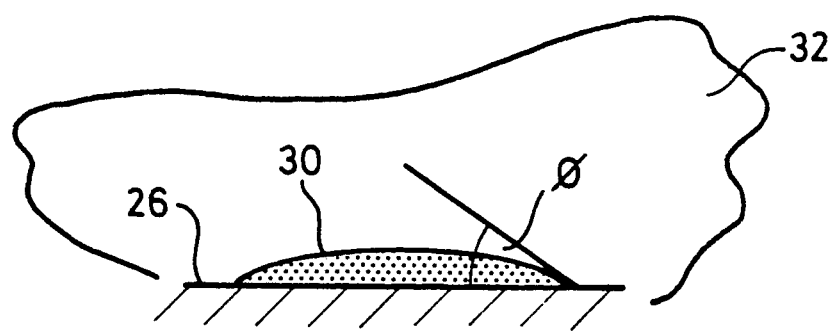

In the second stage, the test above is repeated, but this time in air 32 rather than in water (FIG. 9). The behaviour of the drop is again observed and any contact angle $\theta$ is measured.

To be suitable for use in the Main Test, the solvent 30 must either spread completely on the surface 26 in both the water and air mediums set out above, or must spread almost completely producing a very small contact angle (less than 10°). If the solvent does spread in this way, then it can be assumed that the surface energy of the solvent is the same or substantially the same as that of the surface 26.

MAIN TEST

The main test involves a three phase system with the first particles (which are intended to form the core particle of a composite particle), polymer particles (which are intended to form the shell of the composite particle) and the liquid medium in which it is desired to form composite particles.

The test is carried out using polymer 34 (possibly dissolved in a solvent selected as described for the preliminary test), the liquid medium 36 and a plaque or film 38 of the first particles.

The film or plaque 38 must have a similar surface composition to the surface of the first particles. In order to simulate the surface composition of the first particles, it may be necessary to "condition" the film or plaque by immersion in solutions of (a) any component which would be present on the surface of the first particle and (b) of any added component to be used in the particle formation process.

The test is conducted by immersing the film or plaque in the selected liquid phase 36 at a specific temperature which may for example be 25° C. Care must be taken to avoid air bubble formation on the test piece. A drop of the liquid polymer or polymer solution 34 is allowed to contact the surface of the film or plaque 38 under the liquid phase 36. Where polymer solution or liquid is used which has a density less than the density of the liquid phase, then it is necessary to invert the film or plaque, as shown in FIG. 7a.

The drop of polymer is observed through a goniometer after 30 minutes and after 1 hour. If the two readings are different, another reading will be taken after a further hour has elapsed. The contact angle is determined for both sides of the droplet and the mean is taken as the contact angle $\theta_p$. Where the droplet has spread and no contact angle is discernible (as in FIG. 11), then the angle is considered to be zero.

According to the invention, the condition for production of composite particles is $$\frac{\gamma_{1-3} - \gamma_{1-2}}{\gamma_{2-3}} \geq \frac{1 - V_p^{\frac{2}{3}}}{V_c^{\frac{2}{3}}}$$

and, substituting in the Young-Dupré equation, we can express this as $$\cos\theta_p \geq \frac{1 - V_p^{\frac{2}{3}}}{V_c^{\frac{2}{3}}}$$

The value of $(1 - v_p^{\frac{2}{3}})v_c^{\frac{2}{3}}$ is calculated using the mean diameters for the polymer particles $(\overline{D}_p)$ and first particles $(\overline{D}_c)$. The mean diameter can be measured using a particle sizing instrument, such as a Coulter Nanosizer, which can examine a large number of particles and produce a mean particle diameter. The values of $v_p$ and $v_c$ are then calculated as below:

$$v_p = \frac{D_p^3}{D_p^3 + D_c^3} \text{ and } v_c = 1 - v_p$$

It can be seen that values for $(1 - v_p^{\frac{2}{3}})/v_c^{\frac{2}{3}}$ will always be in the range 0 to 1.

Figure 11:
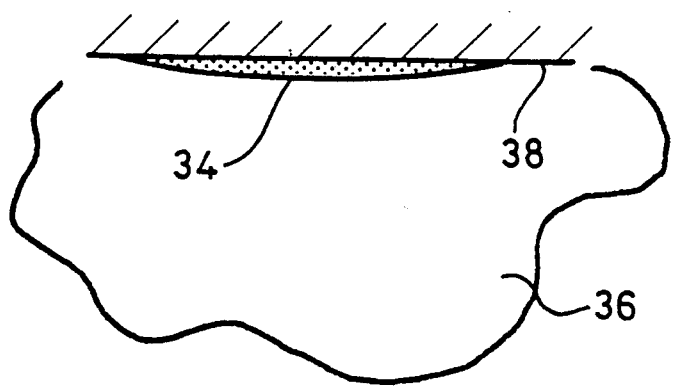

If $\theta_p=0$, $\cos \theta_p=1$ and composite particle formation would occur. This is what happens when complete spreading is seen in the test as shown in FIG. 11.

Figure 12:
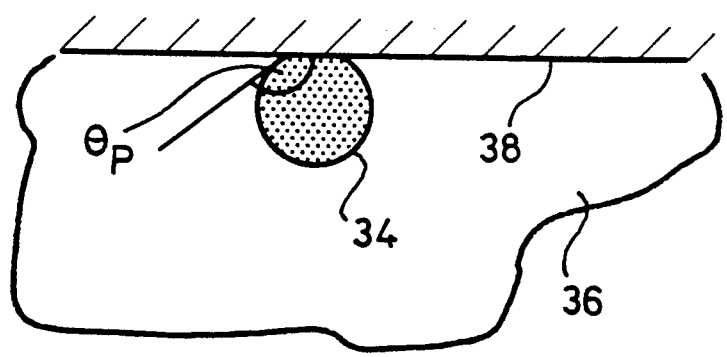

On the other hand, if $\theta_p>90°$ as in FIG. 12, then $\cos \theta_p$ will be less than zero and composite particles will not form.

Where $(1-v_p^{\frac{1}{3}})/v_c^{\frac{1}{3}}$ and $\cos \theta_p$ have similar values, it is recommended that the determination of $\theta_p$ is repeated with at least 3 other solutions of the polymer particles each of different concentration and each having a viscosity less than 10 stokes. Values for the contact angle can then be plotted against reciprocal concentration and the best fit straight line is extrapolated back to 100% concentration to give the value for $\theta_p$.

EXAMPLES

Example 1

A dispersion of polymer particles in water was made. The polymer particles comprised methyl methacrylate—butyl methacrylate copolymer (47–53 w/w) with methoxy poly(ethoxylate) methacrylate at approximately 2000 molecular weight to constitute the surfactant. The particles had been prepared by polymerising a mix of the monomers in water using ammonium persulphate as initiator. The particles exhibited steric stabilisation and they were stable against flocculation and aggregation. The particles had a mean diameter ($\overline{D}_p$) of 670 nm (nanometers) (number average) as measured using a Brookhaven disc centrifuge. The minimum film-forming temperature (MFT) for the particles was 53° C.

The core particles were used as a dispersion in water and comprised poly(butyl acrylate). The particles had been prepared by emulsion polymerisation using dioctyl sodium sulpho-succinate as (anionic) surfactant and ammonium persulphate as initiator. The particles had a mean diameter ($\overline{D}_c$) of 95 nm (number average) as measured using a Brookhaven disc centrifuge.

Figure 13:
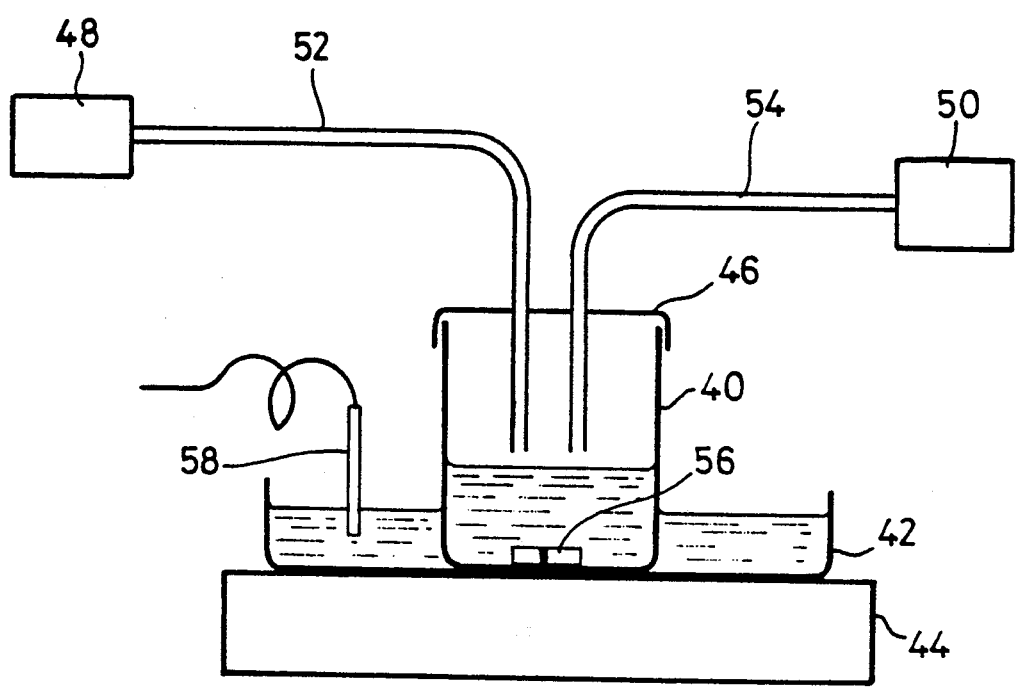
FIG. 13 shows apparatus for use in carrying out the Examples.

To prepare composite particles, the following process was operated using the apparatus shown in FIG. 13. A beaker 40 was placed in a petri-dish 42 partly filled with water and this was placed on a magnetic-stirrer-hotplate 44. The beaker was covered with plasticised PVC film 46. Two syringe pumps 48,50 were used to deliver components to the contents of the beaker through nylon tubing 52,54 pushed through the film. The contents of the beaker were stirred with a magnetic follower 56. The temperature was monitored with a probe 58.

|  | Parts by Weight | Solid Content |
|---|---|---|
| A: dispersion of polymer particles | 126 | 12.3 |
| B: dispersion of core particles | 1 | 0.43 |
| C: dodecyl tri-methyl ammonium bromide (DOTAB) in water | 1.4 | 0.043 |

(ratio of core particles: polymer particles≃12:1 by number)

Component A was charged to the beaker and covered by the plasticised film. The temperature was raised and held at approximately 65° C. and the beaker contents were stirred throughout the process. Using separate feed lines, B and C were introduced to the beaker at a constant rate over one and a half hours. A fluid dispersion was produced with particles stable against flocculation and aggregation.

The dispersion was examined using a Brookhaven disc centrifuge. Particle floccs were not detected. The data did not include a peak corresponding to the original core particles. The data indicated that the final mean particle size was 780 nm.

In a comparative experiment, component C was omitted, but otherwise the process was operated as before. The result was a stable dispersion. However when examined by disc centrifuge, the separate core particles were readily detected and it was concluded that the core particles had retained stability against flocculation and aggregation and that composite particles had not been produced.

The test method was used to assess the relationship $$\frac{\gamma_{1-3} - \gamma_{1-2}}{\gamma_{2-3}} \geq \frac{1 - V_p^{\frac{1}{3}}}{V_c^{\frac{1}{3}}}$$

Preliminary Test

A copolymer with the same composition as the polymer particles was made except that the surfactant precursor (methoxy poly(ethoxylate) methacrylate) was omitted. The polymerisation was carried out with butyl acetate as a solvent.

Films of the copolymer on small glass plates were produced by evaporation of the solvent at elevated temperature. To identify a suitable solvent liquid for the next part of the test, a number of liquids were examined as recommended. Toluene gave complete spreading in air, and under water produced a small contact angle (7°); toluene was suitable under the other criteria also and was selected as the liquid solvent.

Test Method

Supported films of poly(butyl acrylate) were conditioned by 15 minute immersion in 1% dioctyl sodium sulpho-succinate solution and 15 minute immersion in 0.1% DOTAB solution.

A 10% solution of the dried polymer particles in toluene was prepared (viscosity=1.9 stokes as measured in a bubble tube). The liquid phase used in the test method was water which had been previously saturated with toluene.

The conditioned test-piece was mounted inverted in the above liquid phase and a droplet of the polymer particle solution introduced to the surface of the test-piece, and the contact angle observed.

|  | $\theta_p$ | Repeat Sample |
|---|---|---|
| Immediately | 120° | 120° |
| after 30 mins | 25° | 28° |
| after 1 hour | 16° | 20° |
| after 2 hours | 11° | 8° |
| after 3 hours | 11° | 8° |

The value for $\theta_p$ was considered to be approximately 10°

This shows that the relationship in claim 1 was easily fulfilled because $$\frac{\gamma_{1-3} - \gamma_{1-2}}{\gamma_{2-3}} = \cos\theta_p \simeq 0.98$$

and $$\frac{1 - V_P^{\frac{1}{3}}}{V_C^{\frac{1}{3}}} = 0.10$$

Example 2

A dispersion of polymer particles in water was used. The polymer particles comprised methyl methacrylate-butyl acrylate copolymer (72/28 w/w); a surfactant precursor comprising methoxy poly (ethoxylate) methacrylate of approximately 2000 molecular weight (MeOPEG2000 Ma) and a non-ionic surfactant (nonylphenol+20 units of ethylene oxide) was included. The particles had been prepared by polymerising a mix of the monomers in a dilute solution of the surfactant using ammonium persulphate as initiator. The particles exhibited steric stabilisation and they were stable against flocculation and aggregation. The particles had a mean diameter ($\overline{D}_p$) of 125 nm as measured using a Coulter "Nanosizer".

The MFT for the particles was 40° C.

The core particles comprised polystyrene. They had been prepared by the same method as for the core particles in Example 1 and were stabilised by anionic surfactant. The mean diameter ($\overline{D}_c$) was 100 nm, as measured using a Coulter "Nanosizer".

To prepare composite particles, apparatus was used as in Example 1. The formulation used was:

|   | Parts by weight | Solids content |
|---|---|---|
| A: dispersion of polymer particles | 46.5 | 24.2 |
| B: dispersion of core particles | 10.0 | 4.2 |
| C: DOTAB solution | 16.0 | 0.49 |

(ratio of core particles: polymer particles≃1:1)

In this Example, all of C was added to A and the temperature raised and held at 65° C. B was added over 1½ hours. The product was a fluid dispersion of low viscosity but contained some agglomerated or grit particles. Examination using a disc centrifuge indicated the presence of composite particles, some floccs and some remaining core particles.

In a comparative experiment, the process and formulation was as above except that the temperature was held at 25° C. throughout, that is below the operative glass transition temperature for the polymer particles. The product was a low viscosity dispersion but examination by disc centrifuge showed clearly the presence of flocculated particles, polymer particles and core particles.

In a further comparative experiment the process was operated at higher concentration by adding solid DOTAB to A instead of using DOTAB solution. The temperature was maintained at 25° C. The product was very viscous with a cream like appearance. Examination by disc centrifuge showed that it comprised mostly flocculated particles.

Example 3

A dispersion of polymer particles was used as in Example 1. The mean diameter ($\overline{D}_p$) was 670 nm.

The core particles were as used in Example 2. The mean diameter ($\overline{D}_c$) was 100 nm.

|   | Parts by weight | Solids content |
|---|---|---|
| A: dispersion of polymer particles | 110 | 10.7 |
| B: dispersion of core particles | 0.4 | 0.18 |
| C: DOTAB solution | 0.6 | 0.018 |

(ratio of core particles: polymer particles≃5:1)

The process was operated as in Example 1 and the temperature was maintained at 65° C.

The product was a fluid dispersion where the particles were stable against flocculation and aggregation core particles and particle floccs were not detected in any significant number using a disc centrifuge.

The Test Method was used to assess the relationship $$\frac{\gamma_{1-3} - \gamma_{1-2}}{\gamma_{2-3}} \geqq \frac{1 - V_P^{\frac{1}{3}}}{V_C^{\frac{1}{3}}}$$

Test-pieces were made by casting a solution of polystyrene in ethanol and styrene monomer mixture onto small glass plates and drying at elevated temperatures. The test pieces were conditioned as in Example 1. The liquid phase and the solution of polymer particles were prepared and used as in Example 1. The contact angle was observed and become steady at approximately 11° after 1 hour.

The above relationship was fulfilled because $$\frac{\gamma_{1-3} - \gamma_{1-2}}{\gamma_{2-3}} = \cos\theta_p \simeq 0.98$$

and $$\frac{1 - V_P^{\frac{1}{3}}}{V_C^{\frac{1}{3}}} = 0.10$$

Example 4

A dispersion of polymer particles in water was used. The polymer particles comprised methyl methacrylate—ethylhexyl acrylate—methacrylic acid (54.6/43.4/2.0 w/w); a mixture of sodium carboxymethyl cellulose, non-ionic and anionic surfactant had been used in the preparation of the particles, with ammonium persulphate as initiator. Octyl mercaptan had been included during the particle preparation to avoid or reduce the internal gel content which is normal with this type of latex particle. The particles were stable against flocculation and aggregation. The particles had a mean diameter ($\overline{D}_p$) of 300 nm. The MFT of the particles was 17° C. The particles remained stable if diluted with 1 N KCl solution.

The core particles were similar to those in Example 2 except that the mean diameter ($\overline{D}_c$) was 137 nm. These particles flocculated if diluted with 1 N.KCl solution.

|   | Parts by weight | Solids content |
|---|---|---|
| A: dispersion of polymer particles | 100 | 51 |
| B: dispersion of core particles | 2011 | 4.8 |
| C: 1 N. KCl solution | 500 | 37 |

(ratio of core particles to polymer particles≃1:1)

Component A was charged to a beaker, C was added and the temperature was raised and held at 50° C. B was added at a steady rate over 1 hour. The product was a stable dispersion showing no significant aggregation or settlement.

The final dispersion was examined using a disc centrifuge. No significant number of core particles was detected. Examination by election microscopy showed that the final particles were spherical, that the core particles were no longer apparent and that there were no clusters of flocculated core particles.

The Test Method was employed. A solution of polymer was made to comprise methyl methacrylate—ethylhexyl acrylate (54.6/43.4 w/w) and films were produced by casting the solution onto small glass plates and allowing the solvent to evaporate. The preliminary test was operated and ethyl acetate was selected as a suitable solvent liquid for the test. It showed complete spreading on the polymer film in air and under water and fulfilled the other criteria. Dried polymer particles, as used in the process of this example, were dissolved in ethyl acetate at a concentration of 30%. The viscosity was less than 2 stokes.

Test-pieces were prepared as in Example 3. The test-pieces were conditioned by 15 minute immersion in 1% solution of dioctyl sodium sulpho-succinate solution. The liquid phase was 0.2 N. KCl saturated with ethyl acetate.

A drop of the polymer particle solution was introduced to the surface of the test piece under the liquid phase, and the contact angle was observed. After 1 hour, the contact angle was steady at approximately 21°.

$$\frac{\gamma_{1-3} - \gamma_{1-2}}{\gamma_{2-3}} = \cos\theta_p \simeq \cos 21° = 0.98$$

and $$\frac{1 - V_P^{\frac{1}{3}}}{V_C^{\frac{1}{3}}} = 0.30.$$

In a comparative experiment, the same polymer particles and core particles were used in the same ratio, but KCl solution was not used to dilute the particles. When the final dispersion was examined, the core particles had remained in stable dispersion and were readily detected both by the disc centrifuge and by electron microscopy.

Example 5

In this example very dilute dispersions of polymer particles and core particles in water were used so that the particles and the final composite particles could be examined by electron microscopy without any further dilution.

The dispersion of polymer particles was similar to that used in Example 2 except that a tertiary amino methacrylate monomer had been included during preparation of the particles. The dispersion included some solution polymer which included a significant quantity of t-amine. The pH of the dispersion was 6.0.

The core particles comprised polystyrene as in Example 2 except that the particle size was larger (as in the Table below). If mixed with the dispersion of polymer particles, gross flocculation occurred. This could be avoided by dilution of the dispersions before mixing.

The dispersions were diluted approximately 10,000 fold to be suitable for examination by electron microscopy without further dilution.

|  | Solids Content |
|---|---|
| A: dispersion of polymer particles | 2.93 |
| B: dispersion of core particles | 4.20 |

A and B were mixed and shaken briefly at 21° C. The product was a stable dispersion.

The dilute dispersion of polymer particles, core particles and final particles were examined by electron microscopy. By measuring diameters for several hundred particles on the photomicrographs, the size of the particles was determined. Also the particle sizes were measured using a Coulter Nanosizer.

|  |  | Nanosizer | EM ($D_n$) | EM ($D_v$) |
|---|---|---|---|---|
| polymer particles |  | 117 | 103 | 108 |
| core particles |  | 132 | 143 | 146 |
| final particles |  | 162 | 157 | 160 |
| Range for theoretical size | *assuming 1:1 contacts | 157 | 133 | 145 |
|  | +assuming all particles included | 157 | 170 | 174 |

*theoretical size assuming composite particles were produced from 1:1 polymer particles: core particle contacts, leaving residual (excess) polymer particles
+theoretical size assuming all polymer particles were involved in composite particle formation.

Further, it was observed that the final particles were spherical; that they were as monodisperse as the original glassy-polymer core particles and that they appeared to have a soft, non-glassy surface composition.

Example 6

A dispersion of polymer particles was used as in Example 1, except that the mean diameter ($\overline{D}_p$) was 754 nm.

The core particles comprised titanium dioxide pigment which had been treated with a silane compound by the manufacturer to make the pigment hydrophobic. The hydrophobic nature was readily confirmed by adding some of the pigment to water, it was not wetted by the water and remained on the surface. A dispersion of the pigment in water was made in a ball-mill, using dioctyl sodium sulphosuccinate (DOSSS) as anionic surfactant. The mean particle diameter ($\overline{D}_c$) was 223 nm (density=4.05).

To prepare composite particles, apparatus was used as in Example 1. The formulation used was:

|  | Parts by Weight | Solid Content Weight |
|---|---|---|
| A: dispersion of polymer particles | 100 | 9.6 |
| B: dispersion of core particles | 26.5 | 0.90 |
| C: DOTAB solution, equivalent to anionic surfactant on core particles. | 23 | 0.056 |

(ratio of core particles: polymer particles≃1:1)

The process was operated as in Example 1 and the temperature maintained at 70°-75° throughout. The product was a fluid dispersion with particles stable against flocculation and aggregation.

The final dispersion was examined using a disc centrifuge; some core particles or particle floccs were present but most particles appeared to be longer or/and denser than the original polymer particles.

The Test Method was employed to assess the relationship for engulfment. Test pieces were made by forming small plaques of the titanium dioxide pigment in a press. These were suitably mounted so that the surface of the test piece could be held inverted under water. Test pieces were conditioned by 15 minute immersion in a 1% solution of trimethyl chlorosilane in heptane and then further conditioned as in Example 1. The liquid phase and the solution of polymer particles were prepared and used and the test method operated as in Example 1. The contact angle was observed and became steady at 34° after 2 hours.

The relationship for engulfment was fulfilled because $$\frac{\gamma_{1-3} - \gamma_{1-2}}{\gamma_{2-3}} \simeq \cos 34° = 0.83$$

and $$\frac{1 - V_p^{\frac{1}{3}}}{V_c^{\frac{1}{3}}} = 0.20$$

Example 7

A dispersion of polymer particles was used as in Example 1 except that the mean diameter ($\overline{D}_p$) was 675 nm.

The core particles comprised titanium dioxide pigment; the surface of the pigment included some silica. The pigment was hydrophilic. A dispersion of the pigment in water was made in a ball-mill using DOSSS as anionic surfactant. The mean diameter ($\overline{D}_c$) was 248 nm (density = 3.75)

To prepare composite particles, apparatus was used as in Example 1. The formulation used was

|  | Parts by Weight | Solid Content |
| --- | --- | --- |
| A: dispersion of polymer particles | 100 | 9.9 |
| B: dispersion of core particles | 6.6 | 1.7 |
| C: DOTAB solution, 2 × equivalent to anionic surfactant | 6.6 | 0.24 |

(ratio of core particles: polymer particles ≃ 1:1)

The process was operated as in Example 1 and the temperature maintained at approximately 65° C. throughout. The product was a fluid dispersion with particles stable against flocculation and aggregation.

Examination of the final dispersion by disc centrifuge showed that some core particles or floccs were present but most particles corresponded to a size and/or density which was greater than the polymer particles alone.

The Test Method was employed to assess the relationship for engulfment. Test-pieces were made as in Example 6 and were conditioned as in Example 1. The liquid phase and the solution of polymer particles were prepared and used and the Test Method operated as in Example 1.

The contact angle was observed and became steady at 33° after 1 hour.

The relationship for engulfment was fulfilled because $$\frac{\gamma_{1-3} - \gamma_{1-2}}{\gamma_{2-3}} \simeq \cos 33° = 0.84$$

and $$\frac{1 - V_p^{\frac{1}{3}}}{V_c^{\frac{1}{3}}} = 0.24$$

Example 8

This is a comparative example in which the relationship for engulfment was not fulfilled.

Polymer particles and titanium dioxide core particles were as used in Example 7 except that the mean size for the polymer particles was 754 nm. The polymer particles remained stable if diluted with ethanol. The core particles flocculated if diluted with ethanol.

Composite particle preparation was attempted

|  | Parts by Weight | Solid Content |
| --- | --- | --- |
| A: dispersion of polymer particles | 100 | 9.6 |
| B: dispersion of core particles | 25 | 1.14 |
| C: ethanol | 50 | 0 |

(ratio of core particles: polymer particles ≃ 0.9:1)

Component C was added to A and the temperature raised and held at approximately 70° C., and the mix was stirred throughout the process. Component B was metered in over 1 hour and 40 minutes.

The product gave some sediment which appeared to comprise flocculated core particles. Examination by disc centrifuge showed distinct peaks for the polymer particles and some core particles. The present of composite particles was not indicated.

The Test Method was employed to assess the relationship for engulfment. Test pieces were made as in Example 6 and were conditioned by 15 minutes immersion in DOSSS solution (1%) and 15 minutes immersion in 2:1 water: ethanol mixture. The liquid phase and the solution of polymer particles was prepared and used and the Test Method operated as in Example 1.

The contact angle was approximately 180° but could not be observed properly because the polymer solution showed no wetting of the test-pieces at all and it was not possible to prevent the droplet rolling over the surface of the test-piece.

The relationship for engulfment was not fulfilled because $$\theta_p \approx 180°$$

and $$\frac{\gamma_{1-3} - \gamma_{1-2}}{\gamma_{2-3}} \lesssim -1 \text{ and } \frac{1 - V_p^{\frac{1}{3}}}{V_c^{\frac{1}{3}}} = 0.22$$

Example 9

A dispersion of polymer particles was used as in Example 1, where the mean diameter ($\overline{D}_p$) was 754 nm. The MFT was 56° C.

The core particles comprised calcium carbonate which had been surface treated with stearic acid by the manufacturer to make the filler hydrophobic. A dispersion of the filler in water was made in a ball-mill, using DOSSS as anionic surfactant. The mean particle diameter ($\overline{D}_c$) was 202 nm. (density = 2.6 gm.cm$^{-3}$)

To prepare composite particles, apparatus was used as in Example 1. The formulation used was

|  | Parts by Weight | Solid Content |
|---|---|---|
| A: dispersion of polymer particles | 50 | 4.8 |
| B: dispersion of core particles | 25 | 0.51 |
| C: DOTAB solution, equivalent to anionic surfactant on core particles | 25 | 0.0139 |

(ratio of core particles: polymer particles ≃ 2.4:1)

The process was operated as in Example 1 and the temperature maintained at 70°–75° throughout. The product was a fluid dispersion with particles stable against flocculation and aggregation.

The final dispersion was examined using s disc centrifuge. The data gave a broad peak corresponding to composite particles with some polymer particles and some core particles. There was no significant number of particle floccs.

The Test Method was employed to assess the relationship for engulfment. Test pieces were made by forming small plaques of the calcium carbonate filler in a press. The test pieces were suitably mounted so that the surface could be held inverted under water. Test pieces were conditioned by 15 minute immersion in a 1% solution of stearic acid in heptane, and then further conditioned as in Example 1. The liquid phase and the solution of polymer particles were prepared and used and the Test Method operated as in Example 1. The contact angle was observed and became steady at approximately 35° within 20 minutes.

The relationship for engulfment was fulfilled because $$\frac{\gamma_{1-3} - \gamma_{1-2}}{\gamma_{2-3}} \simeq \cos 35° = 0.82, \text{ and } \frac{1 - V_p^{\frac{2}{3}}}{V_c^{\frac{2}{3}}} = 0.18$$

Example 10

A dispersion of polymer particles in ethanol was used. The particles comprised polystyrene and styrene monomer, with MeOPEG 2000 Ma to constitute the surfactant. The particles had been prepared by polymerising a mix of the monomers using azodiisobutyronitrile as initiator. Conversion to polymer was not complete; some of the residual monomers resided in the particle phase and some in the diluent phase. The particles were stable against flocculation and aggregation. The particles had a mean diameter ($\overline{D}_p$) of very approximately 410 nm.

The minimum film forming temperature (MFT) was below 20° C. The particle surfaces included polyethoxylate from the surfactant and were hydrophilic.

The core particles were used as a dispersion in a mixture of hexane and heptane (boiling point = 80° C.). The particles comprised methyl methacrylate/ethyl acrylate (50/50) copolymer and had been prepared by non-aqueous dispersion polymerisation using poly(hydroxystearic acid) methacrylate to constitute the surfactant. The particles had a mean diameter ($\overline{D}_c$) of v.approx 590 nm. The particle surfaces comprised poly(hydroxystearic acid) and were hydrophobic.

To prepare composite particles, apparatus was used as in Example 1. The formulation used was

|  | Parts by Weight | Solid Content |
|---|---|---|
| A: dispersion of polymer particles in ethanol | 46.6 | 4.34 |
| styrene # | 6.5 | |
| B: dispersion of core particles in hexane/heptane mixture | 20.0 | 1.47 |
| C: ethanol | 53.1 | |

(ratio of core particles: polymer particles = 1:10 very approximately)
The styrene was partitioned between the polymer and the liquid phase.

Component C was added to A and the temperature maintained at 25° C. Component B was added over 1½ hours and the dispersion was stirred throughout the process. A fluid dispersion was produced with particles stable against flocculation and aggregation.

Example 11

A dispersion of Polymer particles in a mix of hexane and heptane was used. The polymer particles were similar to the core particles in Example 10 and comprised methyl methacrylate/ethyl acrylate (50/50) copolymer. The particles were stable against flocculation and aggregation. The mean diameter was 590 nm (number average) as measured using a disc centrifuge with a high boiling paraffin as spin-fluid. The MFT was less than 5° C. The particle surfaces comprised poly(hydroxystearic acid) and were lyophilic.

The core particles were the same as the polymer particles in Example 10 and comprised polystyrene as a dispersion in ethanol with styrene present also. The particles had a mean diameter (Dc) of very approximately 410 nm. The particle surfaces comprised polyethoxylate and were lyophobic.

Formulation

|  |  | Parts by Weight | Solid Content |
|---|---|---|---|
| A: | dispersion of polymer particles in hexane/heptane mixture | 73.4 | 5.4 |
| B: | dispersion of core particles in ethanol | 8.8 | 0.82 |
|  | styrene # | 1.23 | |
| C: | heptane | 73.4 | |

(ratio of core particles: polymer particles = 1:1 very approximately)
The styrene was partitioned between the polymer and the liquid phase.

The apparatus and method of Example 10 was used.

A fluid dispersion was produced with particles stable against flocculation and aggregation.

The dispersion was examined using a disc centrifuge with high boiling paraffin as the spin-fluid. The data indicated that composite particles had been produced. No significant number of particle floccs was detected.

Example 12

A dispersion of polymer particles was used as in Example 1. The mean particle size ($\overline{D}_p$) was 666 nm.

The core particles were used as a dispersion in water and comprised polyurethane. The particles had been prepared by a manufacturer using anionic groups to give the particles stability. The particles had a mean diameter ($\overline{D}_c$) of 124 nm.

Formulation

|  | Parts by Weight | Solid Content |
|---|---|---|
| A: dispersion of polymer particles | 205.3 | 20.1 |
| B: dispersion of core particles | 2.5 | 1.0 |
| C: DOTAB solution | 2.5 | 0.077 |

(ratio of core particles: polymer particles≃8:1)

The apparatus and method was used as in Example 1, and the temperature was maintained at 65° C.

The product was a fluid dispersion with particles stable against flocculation and aggregation.

The dispersion was examined using a disc centrifuge. No trace of the smaller core particles could be seen. No particle floccs were detected. The original polymer particles, core particles and final particles were characterised using a Malvern 4700c particle sizer, which gives a distribution of particle size. Histograms of frequency versus particle diameter were constructed. A computer programme was used to predict a histogram for the final particles assuming composite particles had been produced by 8 core particles combining with 1 polymer particle. There was a reasonably good match between this prediction and the actual size distribution measured for the final particles.

Example 13

A dispersion of polymer particles was used as in Example 1, where the mean diameter ($\overline{D}_p$) was 754 nm.

The core particles comprised poly(vinyl chloride). They had been prepared in an autoclave by polymerising vinyl chloride in a dilute solution of an anionic surfactant. The mean particle diameter ($\overline{D}_c$) was 470 nm (density = 1.2 gm.cm$^{-3}$)

Formulation

|  | Parts by Weight | Solid Content |
|---|---|---|
| A: dispersion of polymer particles | 100 | 9.6 |
| B: dispersion of core particles | 9.4 | 3.85 |
| C: acidified amino random copolymer in ethanol* | 6.9 | 0.094 |

(ratio of core particles: polymer particles 1.6:1)
*Component C comprised methyl methacrylate/butyl methacrylate/dimethylaminoethyl methacrylate (38/42/20) which had been prepared in ethanol using azodiisobutyronitrile as initiator (1% on monomers) and primary octyl mercaptan (1% on monomers) as transfer agent. After preparation the pH was lowered to 4.5 by addition of hydrochloric acid.

The process was operated as in Example 1 and the temperature maintained at 70°-75° throughout. The product was a fluid dispersion with particles stable against flocculation and aggregation.

The final dispersion was examined using a disc centrifuge. The data gave only one peak. There was no peak corresponding to the original polymer particles. There was no significant number of flocculated particles.

In a comparative experiment, the process was repeated except that component C was omitted. The product was a fluid dispersion with particles stable against flocculation and aggregation. However examination with a disc centrifuge gave data showing two peaks; one corresponded to the original polymer particles and one corresponded to the original core particles. It was concluded that composite particles had not been produced.

Example 14

Composite particles as made in Example 4 were used. An additional and cross-linked polymer was incorporated by the following process:

|  |  | parts by weight |
|---|---|---|
| A: | Example 1 dispersion composite particles | 100 |
| B: | butyl acrylate | 9.5 |
|  | allyl methacrylate | 0.5 |
|  | t-butyl perbenzoate | 0.4 |
| C: | ascorbic acid | 0.4 |

Component A was placed in a round-bottom glass flask with reflux condenser and a magnetic stirrer. The temperature was raised to 50° C.; the dispersion remained stable. Components B were added. After 30 minutes C was added and the temperature held for a further 3 hours. The monomer was polymerised to form an additional cross-linked polymer within the composite particles.

The product was a stable dispersion of composite particles which included an additional cross-linked polymer.

Example 15

A dispersion of polymer particles in a mix of hexane and heptane was used as in Example 11. The mean particle diameter ($\overline{D}_p$) was 590 nm. The particle surfaces comprised poly(hydroxystearic acid) and were lyophilic.

The core particles comprised titanium dioxide as in Example 7. A dispersion of the particles in ethanol had been prepared by ball-milling the pigment in ethanol with MeOPEG2000Ma/ethyl acrylate (50/50) graft copolymer as polymeric dispersant. 10 parts of graft copolymer to 100 parts of pigment by weight had been used. The mean particle size ($\overline{D}_c$) was 240 nm. The particle surfaces included polyethoxylate and were hydrophilic.

Formulation

|  | Parts by Weight | Solid Content |
|---|---|---|
| A: dispersion of polymer particles in hexane/heptane mixture | 100 | 7.36 |
| B: dispersion of core particles in ethanol | 4.86 | 1.12 |

(ratio of core particles: polymer particles≃2:1)

To prepare composite particles, component B was added to component A over 1½ hours at 25° C. The product was a fluid dispersion with particles stable against flocculation and aggregation.

Example 16

A dispersion of polymer particles was used as in Example 1, except that the mean particle size was 980 nm. Liquid monomers including a difunctional monomer were incorporated into the particles so that after composite particle formation, polymerisation could be induced to produce a third and cross-linked polymer within the composite particles.

The core particles were as in Example 2 and comprised polystyrene. The mean particle diameter was 113 nm.

Formulation

|   |   | Parts by Weight | Solid Content |
|---|---|---|---|
| A: | dispersion of polymer particles | 100 | 10.4 |
| B: | butyl acrylate | 1.24 | |
|    | tetra ethylene glycol dimethacrylate | 0.31 | |
|    | t-butyl perbenzoate | 0.016 | |
| C: | dispersion of core particle | 3.7 | 0.16 |
| D: | DOTAB solution | 7.8 | 0.0024 |
| E: | ascorbic acid | 0.016 | |
| F: | MeOPEG2000Ma/ethyl acrylate graft copolymer (50/50) in ethanol | 0.5 | 0.05 |

(ratio of core particles: polymer particles≈10:1)

The apparatus used was as in Example 1. Component A was charged to the beaker and the temperature raised and maintained at 65° C., with constant stirring. Components B were pre-mixed and added slowly over 1 hour. Components C and D were added simultaneously but through different feed tubes over 1½ hours. A slow supply of nitrogen was bubbled through the mix and component E was added. The mix was maintained at approximately 65° for a further 4 hours. Polymeric surfactant F was added and the dispersion allowed to cool.

The produce was a fluid dispersion of composite particles which were stable against flocculation and aggregation.

I claim:

1. A process for preparing a dispersion of composite particles, which process comprises mixing first particles with a liquid dispersion of polymer particles, the polymer particles being ionically and/or sterically colloidally stable against particle-particle flocculation and agglomeration, wherein the mixing takes place at a temperature above the operative glass transition temperature of the polymer particles and under a condition where $$\frac{\gamma_{1-3} - \gamma_{1-2}}{\gamma_{2-3}} > \frac{1 - v_p^{2/3}}{v_c^{2/3}}$$

where
$\gamma_{1-3}$ is the interfacial energy of the first particle surface/liquid interface
$\gamma_{1-2}$ is the interfacial energy of the first particle surface/polymer particle interface
$\gamma_{2-3}$ is the interfacial energy of the polymer particle surface/liquid interface
$v_p$ and $v_c$ represent the relative volumes of, respectively, the average polymer particle and the average first particle with $v_p + v_c = 1$ and where the first particles are able to make contact with the surfaces of the polymer particles so that when contact occurs between first particles and polymer particles, composite particles are produced as a dispersion in the liquid phase, the composite particles having ionic and/or stearic colloidal stability against particle-particle flocculation and agglomeration.

2. A process as claimed in claim 1, wherein the value of $$\frac{\gamma_{1-3} - \gamma_{1-2}}{\gamma_{2-3}}$$

is greater than 0.5.

3. A process as claimed in claim 1, wherein the surface of the polymer particles remains more hydrophilic/lyophilic than the surface of the first particles during the process.

4. A process as claimed in claim 1, wherein the polymer particles are dispersed in a non-aqueous liquid medium and wherein the first particles have a lyophobic surface in the liquid medium and the polymer particles have a surface composition which includes oligomer or polymer or polymer components soluble in the liquid phase sufficient to give these particles a lyophilic surface.

5. A process as claimed in claim 1, wherein the first particles are dispersed in a liquid medium prior to being mixed with the polymer particle dispersion.

6. A process as claimed in claim 5, wherein the liquid medium of the first particle dispersion is miscible with the liquid medium of the polymer particle dispersion.

7. A process as claimed in claim 5, wherein the first particles include a surfactant in order to maintain the particles stable in their liquid medium.

8. A process as claimed in claim 1, wherein the polymer particles are dispersed in an aqueous medium.

9. A process as claimed in claim 8, wherein the first particles have a hydrophobic surface and the polymer particles have a surface composition which includes oligomer or polymer or polymer components soluble in the liquid phase sufficient to give the polymer particles a hydrophilic surface.

10. A process as claimed in claim 1, wherein the first particles are pigment particles.

11. A process as claimed in claim 1, wherein the first particles are filler or extender particles.

12. A process as claimed in claim 1, wherein the first particles are polymer particles.

13. A process as claimed in claim 12, wherein the polymer particles are made by an emulsion polymerisation process.

14. A process as claimed in claim 1, wherein the polymer particles include an organic liquid residing at least partly inside the polymer particles.

15. A process as claimed in claim 1, wherein the liquid dispersion of polymer particles is a naturally occurring, naturally stabilised latex.

16. A process as claimed in claim 1, wherein the first particles are added slowly to the dispersion of polymer particles.

17. A process as claimed in claim 1, wherein a further component is added to the mixture of the first particles and the polymer particles in dispersion, the further component being effective to alter the stability of one or the other or both of the particle types in the dispersion or to vary one or more of the interfacial energies.

18. A process as claimed in claim 1, wherein the first particles are in a liquid dispersion, which dispersion is unstable to dilution with another liquid, and the polymer particles are in dispersion in said another liquid.

19. A process as claimed in claim 17, wherein the first particles are initially ionically stabilised in the mixture and the polymer particles are at least partly sterically stabilised, and wherein a compound of opposite charge to the first particle stabilisation is added to the mixture to destabilise the first particles.

20. A process as claimed in claim 17, wherein the first particles are initially ionically stabilised in the mixture and the polymer particles are at least partly sterically stabilised, and wherein an electrolyte compound is added to the mixture to destabilise the charged first particles.

21. A process as claimed in claim 19, wherein the compound of opposite charge is selected to increase the hydrophobic nature of the first particles.

22. A process as claimed in claim 21, wherein the compound of opposite charge is a surfactant.

23. A process as claimed in claim 21, wherein the compound of opposite charge is a polymer.

24. A process as claimed in claim 17, wherein the further component is a polymer which includes the same polymeric components as are present in the polymer particles.

25. A process as claimed in claim 1, wherein the ratio of polymer particles to first particles is approximately 1:1.

26. A process as claimed in claim 1, wherein there are more first particles than polymer particles.

27. A process as claimed in claim 1, wherein the polymer particles are larger than the first particles.

28. A process for preparing a dispersion of composite particles in a liquid phase, the composite particles being stable against flocculation and aggregation, which process comprises mixing first particles, which particles are not stable against flocculation and aggregation in the process, with a liquid dispersion of polymer particles where the polymer particles are stable against flocculation and aggregation; wherein the mixing takes place at a temperature above the operative glass transition temperature of the polymer particles and where $$\theta_p < 90°$$

and $$\cos\theta_p \geq \frac{1 - V_p^{\frac{1}{3}}}{V_c^{\frac{1}{3}}}$$

where $v_p$ and $v_c$ represent the relative volumes of, respectively, the average polymer particle and the average average first particle, with $v_p + v_c = 1$ and where p is the contact angle made by the material of the polymer particles in an environment of the liquid phase at a surface which has the surface composition of the first particles.

* * * * *